Feb. 24, 1931.   N. C. CHRISTENSEN   1,793,906
PROCESS OF PRECIPITATING METALS FROM SOLUTIONS AS SULPHIDES
Filed May 3, 1926
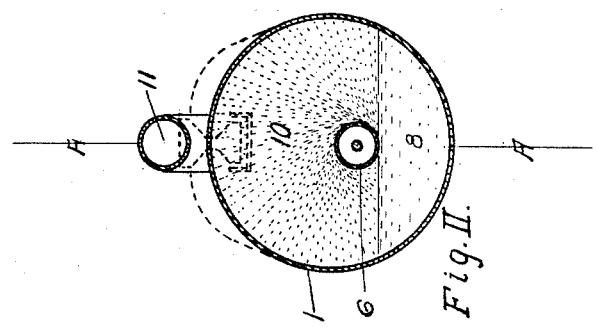
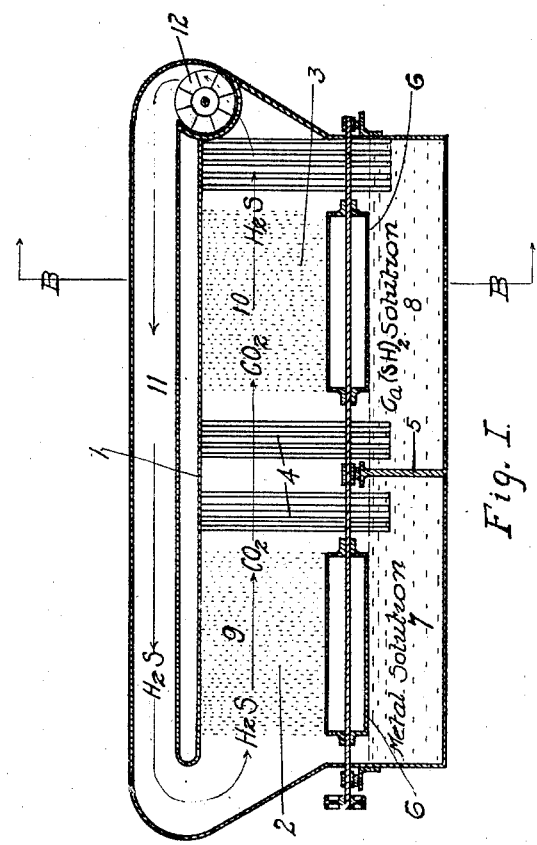
Niels C. Christensen,
INVENTOR.

Patented Feb. 24, 1931

1,793,906

UNITED STATES PATENT OFFICE

NIELS C. CHRISTENSEN, OF SALT LAKE CITY, UTAH

PROCESS OF PRECIPITATING METALS FROM SOLUTIONS AS SULPHIDES

Application filed May 3, 1926. Serial No. 106,567.

This invention relates to processes for the precipitation of metals from solutions as sulphides by means of $H_2S$ and $CaCO_3$. It may be used with either chloride or sulphate solutions but is particularly applicable to chloride solutions. As noted in my U. S. patent application 66,400 such metals as zinc, iron and manganese, the precipitated sulphides of which are soluble in dilute mineral acids, may be precipitated from their chloride solutions as sulphides by means of $H_2S$ and calcium carbonate. As also noted in this patent application, lead may also be precipitated as a sulphide from slightly acid brines in which the lead sulphide precipitate is soluble, by means of $H_2S$ and calcium carbonate. As also noted in the above mentioned patent application the precipitation of these sulphides may be made selective by the addition to the solution containing $H_2S$ of the finely divided calcium carbonate in successive calculated amounts, PbS being precipitated first, ZnS second, FeS third and MnS last. In order to make clean separate products certain precautions are necessary, particularly in the selective precipitation of the zinc, iron and manganese. To secure the best results the solution should contain sufficient $H_2S$ at all times to maintain a slightly acid solution and the calcium carbonate and $H_2S$ should be added together at such a rate that the acid is not neutralized to such a point that the sulphides other than the one which it is desired to precipitate are thrown down. For example if the zinc is being precipitated the solution should first be saturated with $H_2S$ so that the reaction $ZnCl_2+H_2S=ZnS+2HCl$ proceeds as far as possible (toward the right hand side of the equation). Then the $H_2S$ and finely divided $CaCO_3$ should be added together (preferably in as near chemically equivalent amounts as possible), at such a rate as to maintain this original slightly acid condition as nearly as possible, until the desired amount of zinc is precipitated. During the addition of the $CaCO_3$ and $H_2S$ the solution should be vigorously agitated to prevent local concentration of $CaCO_3$ sufficient to neutralize all the acid and allow precipitation of iron or manganese sulphides. The $CaCO_3$ neutralizes the acid to the point where the zinc sulphide is precipitated as indicated in the following equations:

$$2HCl+CaCO_3=CaCl_2+H_2CO_3$$

$$ZnCl_2+H_2S=ZnS+2HCl$$

If the proper conditions are maintained as given in the foregoing, practically all the zinc may be precipitated in a pure condition, practically free from iron or manganese. However in commercial operation the safest and probably the best method would be to precipitate most of the zinc and after filtering out the ZnS, to precipitate a small middling product of mixed ZnS and FeS between the main zinc and iron precipitations. This middling precipitate may be utilized as such may be used to precipitate lead from the solution previous to the zinc precipitation or may be used to neutralize residual acid in the original solution which is to be treated. In either of the latter cases the zinc and iron are again brought into solution and may be recovered as pure products by subsequent precipitations.

After the precipitation of the zinc from the solution (or preferably after the middling product of mixed ZnS and FeS), the same precautions as above mentioned should be taken in the precipitation of the iron. The solution should preferably first be saturated with $H_2S$ so that the reaction $$FeCl_2+H_2S=FeS+2HCl$$

may proceed as far as possible (toward the right hand side of the equation). $H_2S$ and $CaCO_3$ are then added together (preferably in as near chemically equivalent amounts as possible, or preferably with an excess of $H_2S$), at such a rate as to maintain as nearly as possible the acid condition at the beginning of the iron precipitation, until the iron is all precipitated. In practical operation it would probably be preferable to precipitate nearly all the iron, after which a small middling product of mixed FeS and MnS would be precipitated by the addition of an additional small amount of $CaCO_3$ as in the case of the zinc precipitation. In this way a pure FeS product may be secured. The small mixed FeS and MnS precipitate may be used as such, to precipitate Pb from the original solution or to neutralize acid in the original solution in the same way as the mixed ZnS-FeS middling precipitate. The precipitated ZnS, FeS and MnS will precipitate lead from solution or neutralize the acid in the original solution as indicated below

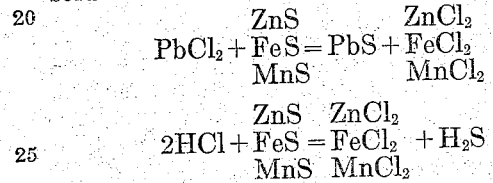

In this way the metals in the middling product may be returned to solution and all the Zn, Fe and Mn may be recovered as pure products.

After precipitation of the FeS (or preferably after the middling product) the Mn may be precipitated by continued addition of $CaCO_3$ and $H_2S$ as described or may be precipitated by means of $Ca(OH)_2$ and $H_2S$ or with $Ca(SH)_2$ if desired as noted in U. S. application Serial No. 66,400 mentioned above.

It should be noted in connection with the precipitation of the metals as described above, that the conditions during precipitation will vary with the character of the solutions. For example the reaction

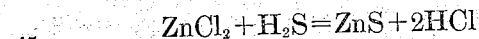

proceeds farther (toward the right) in a rather dilute water solution of $ZnCl_2$ than in a concentrated sodium or calcium chloride brine containing $ZnCl_2$. With the former the reaction may proceed until an acid concentration in solution near 0.6% is reached while in a concentrated brine the reaction will proceed only to a point where between 0.2% and 0.3% acid concentration is reached in solution. During the iron precipitation the maximum acid concentration which may be reached in the solution is much less than in the case of the zinc precipitation, and the concentration which may be reached during the Mn precipitation is less than in the case of the iron precipitation. To secure the same grade of precipitate relatively greater care in the addition of reagents so as to maintain proper conditions is necessary with the iron than the zinc precipitation. If the proper conditions are maintained the zinc may be secured as a beautiful pure white precipitate of ZnS, the iron as a pure coal black precipitate of FeS and the manganese as a pure orange colored precipitate of MnS.

In order to secure pure precipitates and rapid precipitation pure finely divided $CaCO_3$ is necessary. Also in order to secure satisfactory results the $H_2S$ must be pure and relatively concentrated. A pure finely pulverized limestone may be used but pure precipitated $CaCO_3$ is more satisfactory. Pure $H_2S$ gas is also much preferable to a gas dilute with air or $CO_2$. At first glance it may appear to be practically impossible to operate under these conditions as the $H_2S$ is constantly contaminated with $CO_2$ from the reaction which takes place during precipitation. It would also appear that the use of pure precipitated $CaCO_3$ would be too expensive for many practical operations. The control and storage of $H_2S$ generated in such processes as those described in my U. S. Patents Nos. 1,539,711, 1,539,712 and 1,539,714 and U. S. patent application No. 66,400, in connection with which the process of precipitation herein described is designed to be used also appears to be a matter of some difficulty. I aim however to overcome all these difficulties by my preferred method and apparatus for use in this process of precipitation whether the process is used for either a simple or a selective precipitation. By my preferred method of carrying out my process I aim to make a very efficient absorption or collection of the $H_2S$ in such form that it may be stored and used with a minimum of difficulty. I also aim to avoid any difficulty due to dilution of $H_2S$ with $CO_2$ during the precipitation of the sulphides and at the same time to make the pure precipitated $CaCO_3$ which is most desirable in the process. My preferred method also makes it possible to always be sure of an amount of $H_2S$ in excess of the chemical equivalent of the $CaCO_3$ used in the process. It also prevents loss of $H_2S$ and obviates the necessity of continuous passage of new $H_2S$ through the solution and reabsorption to eliminate the $CO_2$ generated.

My preferred method of utilizing my process is carried out in a special apparatus which is simple and efficient and of very high capacity.

The first step in my preferred process consists in absorbing the $H_2S$ (generated in the processes described in my U. S. Patents Nos. 1,539,711, 1,539,712 and 1,539,714 and my U. S. patent application No. 66,400 or from other sources) in a lime emulsion (or with lime and water) to form a calcium sulphydrate $(Ca(SH)_2)$ solution. My preferred method of carrying out this step consists in passing the $H_2S$ gas through a spray of an emulsion of $Ca(OH)_2$ in water in such a manner as to absorb the $H_2S$ most efficiently and secure a relatively concentrated $Ca(SH)_2$ solution. The apparatus which I prefer to use for this purpose consists of a rapidly revolving cylinder dipping slightly into the lime emulsion to be sprayed and enclosed in a housing through which the $H_2S$ gases are passed. This apparatus forms a spray from such emulsions with a minimum of power and with no difficulties such as those due to clogging of nozzles, or filling of towers when attempting to use these with an emulsion. The apparatus and its methods of use are described in my U. S. Patent No. 1,462,363. In this absorption step of my process I prefer to pass the $H_2S$ gas through a series of such spray chambers counter current to the flow of $Ca(OH)_2$ emulsion so as to secure the maximum absorption of $H_2S$ and highest concentration of $Ca(SH)_2$ solution possible. The $Ca(SH)_2$ solution coming from the absorption apparatus should be filtered to remove the residual silica, calcium carbonate, alumina, magnesia, etc., and the black precipitate of FeS which is made even with the best grade lime from traces of iron in the limestone used in the manufacture of the $Ca(OH)_2$. This pure solution will then contain practically nothing but $Ca(SH)_2$ and a small excess of $H_2S$ and is ready for use in the second step of my process in which the precipitation of the sulphides and the precipitation of the $CaCO_3$ are carried out.

The precipitation step of my process is carried out as follows: $H_2S$ is passed into the solution until the desired or necessary saturation is reached, thereafter $H_2S$ and $CaCO_3$ are simultaneously added at the proper rate while the solution is being agitated. The $CO_2$ generated during the precipitation is passed into calcium sulphydrate solution driving off $H_2S$ and precipitating $CaCO_3$ as indicated in the following chemical equation:

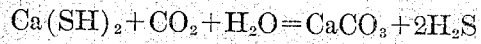
$$Ca(SH)_2 + CO_2 + H_2O = CaCO_3 + 2H_2S$$

The pure $H_2S$ thus generated is used as the precipitant for the metals together with pure $CaCO_3$ precipitated in this manner.

This precipitation is preferably carried out in closed spray chamber which is divided into two separated portions by suitable baffles or eliminators to prevent the passage of spray or liquid from one chamber to the other and yet allow the circulation of the gases through the sprays. In each of the compartments a spray device consisting of a rotating cylinder, as described above, is placed for spraying liquid into the space in the chamber above the liquid. The two spray chambers are connected at opposite ends by means of a suitable duct or pipe in which a fan is placed to continuously circulate the gases through the stray in both chambers. In one of the compartments the solution to be precipitated is placed and in the other $Ca(SH)_2$ is placed. The sprays are then placed in operation and $H_2S$ is then passed into the apparatus until the metal solution is saturated to the point desired. $CaCO_3$ preferably in an emulsion with water is then slowly added to the metal solution causing the precipitation of the metal sulphide and the generation of $CO_2$. The $CO_2$ is circulated into the other compartment of the apparatus (by means of the fan and pipe) and is absorbed in the $Ca(SH)_2$ solution precipitating $CaCO_3$ and generating $H_2S$. The $H_2S$ thus generated is circulated through the solution spray and is absorbed therein thus making up for the $H_2S$ consumed in precipitating the metals and maintaining the required saturation of $H_2S$ as $CaCO_3$ is added to the metal solution. Since twice as much $H_2S$ as is necessary for precipitation of the metals is generated by the action of $CO_2$ on the $Ca(SH)_2$ provision must be made for reabsorbing this $H_2S$ to form more $Ca(SH)_2$. The apparatus may be so constructed that the pressure due to this excess $H_2S$ may build up to any desired point so that the precipitation is conducted under pressure. By this means a more rapid absorption of $H_2S$ is secured and the capacity of the apparatus is considerably increased. If desired the process may be conducted at ordinary pressure but the best results are secured by allowing the pressure to build up to at least two atmospheres so as to off-set the effect of the dilution with $CO_2$ on the rate of absorption of $H_2S$ and the strength of $H_2S$ solution obtainable.

The foregoing brief description will be made clearer by reference to the accompanying diagram of the apparatus. Figure (1) shows a vertical longitudinal section through the apparatus on the line A—A of Fig. II and Fig. II shows a vertical section on the line B—B of Fig. I. As noted above the apparatus consists of a closed spray chamber (1) divided into two spray compartments (2) and (3) by the baffles or eliminators (4) and solution partition (5). In each of the compartments (2) and (3) is a rotor spray (6) which throws a spray of the solution contained in the lower parts (7) and (8) of each of the compartments into the gas in the upper parts (9) and (10) of each of the compartments. The gases in the apparatus are circulated through the spray in the two spray compartments through the pipe (11) and fan (12) as indicated by the arrows. The operation of the apparatus is as follows: The lower part (7) of one of the compartments (2) is filled with solution of the metal to be precipitated to the level of the lower part of the spray drum (6) so that the drum dips slightly into the solution and the cylinder or rotor (6) is rotated at such a speed that the upper part (9) of the chamber is filled with a spray of the desired kind (which is regulated by the speed and depth of dipping into the solution). The lower part (8) of the other compartment (3) is filled (to the level of the lower part of the rotor (6) ) with Ca(SH)$_2$ and the rotor is revolved so that the upper part (10) of this compartment is filled with spray of the Ca(SH)$_2$ solution. H$_2$S is introduced into the apparatus until the spaces (9) and (10) are filled with the gas and the solutions saturated to the desired degree. The gases in these compartments are circulated through the apparatus by the fan (12) as indicated by the arrows. CaCO$_3$ (preferably mixed with water to form a thin emulsion) is then introduced into the solution in (2) at the desired rate until the precipitation is completed to the point desired. The introduction of the CaCO$_3$ causes the precipitation of the metal sulphide by neutralizing the acid formed as indicated below:

$$\text{"M"Cl}_2 + \text{H}_2\text{S} = 2\text{HCl} + \text{"M"S}$$

$$2\text{HCl} + \text{CaCO}_3 = \text{CaCl}_2 + \text{H}_2\text{O} + \text{CO}_2$$

The CO$_2$ thus liberated is passed through the spray of Ca(SH)$_2$ solution in the other compartment (10) causing the precipitation of CaCO$_3$ and releasing H$_2$S as indicated below:

$$\text{Ca(SH)}_2 + \text{CO}_2 + \text{H}_2\text{O} = \text{CaCO}_3 + 2\text{H}_2\text{S}$$

The H$_2$S passes through the spray in the metal solution compartment (a) maintaining the H$_2$S saturation in this solution and furnishing H$_2$S for the precipitation of the metal sulphide. By the addition of the correct amount of Ca(SH)$_2$ solution in compartment (3) and of CaCO$_3$ emulsion in proper proportion to the solution to be precipitated in compartment (2) the precipitation may be carried to any desired point. The pressure of H$_2$S in the apparatus may be maintained at any desired amount by regulating the amount of H$_2$S released as the precipitation progresses. When the precipitation is completed to the desired point the two solutions are run into separate tanks and the precipitated metal sulphide and precipitated CaCO$_3$ are settled or filtered out. The CaCO$_3$ is washed to remove any Ca(SH)$_2$ solution and is used in precipitating other metal sulphides as described.

After the removal of the precipitated metal sulphide by settling or filtration the solution may be returned for the precipitation of other metals as described above in my selective process of precipitation.

It will be apparent from the foregoing that by this method pure H$_2$S and pure CaCO$_3$ for the precipitation are obtained and the difficulties of maintaining a sufficient saturation of H$_2$S, without loss or continued re-absorption of H$_2$S, is overcome and that the H$_2$S is obtained and used in a form most suitable for collection and storage. The advantages thus obtained will be apparent to chemists and metallurgists engaged in similar lines of work.

My method of precipitation as noted above may be used for solutions of any kind but is especially suited for chloride solutions as the CaCl$_2$ formed in solution during the operation may be washed out of the precipitated sulphide. If sulphate solutions are precipitated the CaSO$_4$ formed contaminates the precipitated sulphides and all the CaCO$_3$ may not be used up due to the coating effect of the CaSO$_4$ on the particles of CaCO$_3$.

It is obvious that my process may be used for the precipitation from solution as sulphides of any metals whose sulphides are soluble in slightly acid solutions, and therefore require the use of the CaCO$_3$ together with the H$_2$S in order to secure the precipitation of the metal sulphides. For example copper cadmium and cobalt may be precipitated from chloride solutions and brines by this process.

It is also obvious that a considerable variety of selective precipitations of sulphides other than those mentioned may be secured by my process of using CaCO$_3$ together with H$_2$S in order to maintain the proper conditions of very slight acidity to secure selective precipitation of the sulphides. The great advantage of this substantially automatic method of maintaining the proper acid conditions within the very narrow limits required for selective precipitation will be apparent to all chemists and metallurgists. By the proper use of CaCO$_3$ and H$_2$S metals the solubilities of whose precipitated sulphides differ very slightly in the various solutions used may be selectively precipitated and separated from each other as pure products, the slight difference in acid concentration necessary for this selective precipitation being automatically maintained by the proper use of the CaCO$_3$ and H$_2$S. By this means the most difficult and delicate separations are made possible and in fact are made very simple by maintaining a sufficient saturation of H$_2$S and by adding the CaCO$_3$ in such a manner as to avoid neutralizing the acid formed in solution to a degree which allows the precipitation of the sulphides slightly more easily soluble than the one it is desired to precipitate first. This may appear a delicate process but is in fact a simple matter as witness the selective or differential precipitation of zinc, iron and manganese described in the foregoing and also described in my U. S. patent application No. 66,400. It is obviously impossible to describe all the possible applications of my process or variations in the details of its use and I do not desire therefore to be limited entirely by the foregoing description except as interpreted in the appended claims.

Having described my process and preferred methods and apparatus for carrying it out what I claim and desire to patent is:

1. The process of precipitating from solutions metals whose sulphides are soluble in such solutions if slightly acid, which consists in the simultaneous treatment of said solutions with $CaCO_3$ and $H_2S$ by adding one of said reagents to said solution in the presence of the other in said solution.

2. The process of precipitating from chloride solutions metals whose sulphides are soluble in such solutions if slightly acid, which consists in the simultaneous treatment of said solutions with $CaCO_3$ and $H_2S$ by adding one of said reagents to said solution in the presence of the other in said solution.

3. The process of precipitating from chloride brines metals whose sulphides are soluble in such brines if slightly acid, which consists in the simultaneous treatment of said brines with $CaCO_3$ and $H_2S$ by adding one of said reagents to said solutions in the presence of the other in said solution.

4. The process of precipitating from solutions metals whose sulphides are soluble in such solutions if slightly acid by simultaneous treatment of said solution with $H_2S$ and $CaCO_3$, which consists in impregnating said solutions with $H_2S$ and adding finely divided $CaCO_3$ to said impregnated solution and thereby precipitating metals therefrom as sulphides.

5. The process of precipitating from solutions metals whose sulphides are soluble in such solutions if slightly acid by simultaneous treatment of said solutions with $H_2S$ and $CaCO_3$, which consists in impregnating said solutions with $H_2S$ and adding $CaCO_3$ and $H_2S$ to said solutions and thereby precipitating metals therefrom as sulphides.

6. The process of selectively precipitating from solutions metals whose sulphides are soluble in such solutions if slightly acid by simultaneous treatment of said solutions with $H_2S$ and $CaCO_3$, which consists in impregnating said solutions with $H_2S$ and adding $CaCO_3$ to said impregnated solution and thereby precipitating as a sulphide one of a number of metals dissolved in said solution.

7. The process of selectively precipitating from solutions metals whose sulphides are soluble in such solutions if slightly acid by simultaneous treatment of said solutions with $H_2S$ and $CaCO_3$, which consists in impregnating said solutions with $H_2S$ and adding $CaCO_3$ and $H_2S$ to said impregnated solution and thereby precipitating as a sulphide one of a number of metals contained in said solution.

8. The process of selectively precipitating from solutions metals whose sulphides are soluble in such solutions if slightly acid by simultaneous treatment of said solutions with $H_2S$ and $CaCO_3$, which consists in saturating said solutions with $H_2S$ and adding $CaCO_3$ to said saturated solutions and thereby precipitating as a sulphide one of a number of metals contained in said solution.

9. The process of selectively precipitating from chloride brines metals whose sulphides are soluble in such brines if slightly acid by simultaneous treatment of said solutions with $H_2S$ and $CaCO_3$, which consists in impregnating said solutions with $H_2S$ and adding $CaCO_3$ to said impregnated solution and thereby precipitating as a sulphide one of a number of metals in said solution.

10. The process of selectively precipitating from chloride brines metals whose sulphides are soluble in such brines if slightly acid by simultaneous treatment of said solutions with $H_2S$ and $CaCO_3$, which consists in impregnating said brines with $H_2S$ and adding $CaCO_3$ and $H_2S$ and thereby precipitating as a sulphide one of a number of metals contained in said solution.

11. The process of selectively precipitating from chloride brines metals whose sulphides are soluble in such brines if slightly acid by simultaneous treatment of said solutions with $H_2S$ and $CaCO_3$, which consists in saturating said brines with $H_2S$ and adding $H_2S$ and $CaCO_3$ thereto and thereby precipitating as a sulphide one of a number of metals contained in said brine.

12. The process of precipitating from solutions metals whose sulphides are soluble in such solutions if slightly acid, which consists in treating said solutions simultaneously with $CaCO_3$ and $H_2S$ and thereby precipitating metal from solution as a sulphide and forming $CaCl_2$ and $CO_2$ and treating $Ca(SH)_2$ solution with said $CO_2$ to form $H_2S$ and $CaCO_3$ and using said $H_2S$ and $CaCO_3$ to precipitate more metal from solution as described.

13. The process of precipitating from chloride brines metals whose sulphides are soluble in such brines if slightly acid, which consists in treating said solutions simultaneously with $H_2S$ and $CaCO_3$ and thereby precipitating metal from solution as a sulphide and forming $CaCl_2$ and $CO_2$ and treating $Ca(SH)_2$ solution with said $CO_2$ to form $H_2S$ and $CaCO_3$ and using said $H_2S$ and $CaCO_3$ to precipitate more metal from solution as described.

14. The process of precipitating from solutions metals whose sulphides are soluble in such solutions if slightly acid, which consists in enclosing said metal solution and a $Ca(SH)_2$ solution in separate portions of a closed chamber and forming separate sprays from said solutions in said chamber and circulating gases in said chamber through said sprays of said solutions and adding $H_2S$ and $CaCO_3$ to said metal solution and thereby precipitating metal from said solution as a sulphide and forming $CaCl_2$ and $CO_2$ and passing said $CO_2$ into said spray of $Ca(SH)_2$ solution and thereby precipitating $CaCO_3$ and forming $H_2S$ and passing said $H_2S$ into said spray of metal solution and adding more $CaCO_3$ thereto and thereby precipitating more metal as a sulphide, and using said precipitated $CaCO_3$ together with $H_2S$ to precipitate metals from solution as described.

15. The process of precipitating metals from solutions as sulphides by simultaneous treatment of said solutions with $H_2S$ and $CaCO_3$ which consists in impregnating said solutions with $H_2S$ and adding $H_2S$ and finely divided calcium carbonate in substantially equivalent amounts so as to maintain the acidity of said solution at such a concentration as to allow the precipitation of said metals as sulphides.

16. The process of precipitating metals from chloride solutions as sulphides by simultaneous treatment of said solutions with $H_2S$ and $CaCO_3$ which consists in impregnating said solutions with $H_2S$ and adding $H_2S$ and finely divided calcium carbonate in substantially equivalent amounts so as to maintain the acidity of said solution at such a concentration as to allow the precipitation of said metals as sulphides.

17. The process of precipitating metals from chloride brines as sulphides by simultaneous treatment of said solutions with $H_2S$ and $CaCO_3$ which consists in impregnating said solutions with $H_2S$ and adding $H_2S$ and finely divided calcium carbonate in substantially equivalent amounts so as to maintain the acidity of said solution at such a concentration as to allow the precipitation of said metals as sulphides.

18. The process of selectively precipitating metals from solutions as sulphides by simultaneous treatment of said solutions with $H_2S$ and $CaCO_3$ which consists in impregnating said solution with $H_2S$ and adding $H_2S$ and finely divided calcium carbonate in substantially equivalent amounts and in amount substantially equivalent to the metal to be precipitated and thereby maintaining the acidity of said solution at such a concentration as to allow the precipitation of one of said metals in solution as a sulphide and prevent the precipitation of other metals in said solution.

19. The process of selectively precipitating metals from chloride solutions as sulphides by simultaneous treatment of said solutions with $H_2S$ and $CaCO_3$ which consists in impregnating said solution with $H_2S$ and adding $H_2S$ and finely divided calcium carbonate in substantially equivalent amounts and in amount substantially equivalent to the metal to be precipitated and thereby maintaining the acidity of said solution at such a concentration as to allow the precipitation of one of said metals in solution as a sulphide and prevent the precipitation of other metals in said solution.

20. The process of selectively precipitating metal from chloride brines as sulphides by simultaneous treatment of said solutions with $H_2S$ and $CaCO_3$ which consists in impregnating said solution with $H_2S$ and adding $H_2S$ and finely divided calcium carbonate in substantially equivalent amounts and in amount substantially equivalent to the metal to be precipitated and thereby maintaining the acidity of said solution at such a concentration as to allow the precipitation of one of said metals in solution as a sulphide and prevent the precipitation of other metals in said solution.

In testimony whereof I have signed my name to this specification.

NIELS C. CHRISTENSEN.